United States Patent [19]

Holm et al.

[11] Patent Number: 4,799,648
[45] Date of Patent: Jan. 24, 1989

[54] TRAILER JACK USING FULL SIZED SPARE TIRE

[76] Inventors: David A. Holm, 8416 Dupont Ave. North, Brooklyn Park, Minn. 55444; Wesley C. Denault, 2815 39th Ave. South, Minneapolis, Minn. 55406

[21] Appl. No.: 939,528

[22] Filed: Dec. 8, 1986

[51] Int. Cl.[4] ............................................. B60S 9/02
[52] U.S. Cl. .............................. 254/420; 254/427; 254/97; 16/19
[58] Field of Search ............ 254/420, 427, 418, 95–97, 254/424, 6 R, 6 C; 16/19, 32, 33, 35 R

[56] References Cited

U.S. PATENT DOCUMENTS

| | | |
|---|---|---|
| 2,339,577 | 1/1944 | Nalle ........................................ 16/19 |
| 3,818,542 | 6/1974 | Jones ........................................ 16/19 |
| 3,934,052 | 1/1976 | Weber et al. .......................... 254/420 |

Primary Examiner—Frederick R. Schmidt
Assistant Examiner—Judy J. Hartman
Attorney, Agent, or Firm—Henry C. Kovar

[57] ABSTRACT

An improved trailer jack has a castor structure enabling use of a full size spare trailer wheel and tire on the jack; the jack has a gear box mechanism, a lift post drivable up and down by the gearbox, and a lift element pivotally journaled inside the post; the lift element has an offset structure which raises the spare axle axis up to a level above the bottom of the post and the axle is spaced to one side so that when the full size spare wheel and tire is used, it pulls up into a locked storage position above and alongside on the trailer tongue, when the spare is down, it swivels completely around under the tongue and around the lift post. The trailer is much easier to manually manipulate in a garage or driveway.

An improved lift assembly with a unique swiveling lift member having both a trailing offset and transverse offset is utilized.

18 Claims, 2 Drawing Sheets

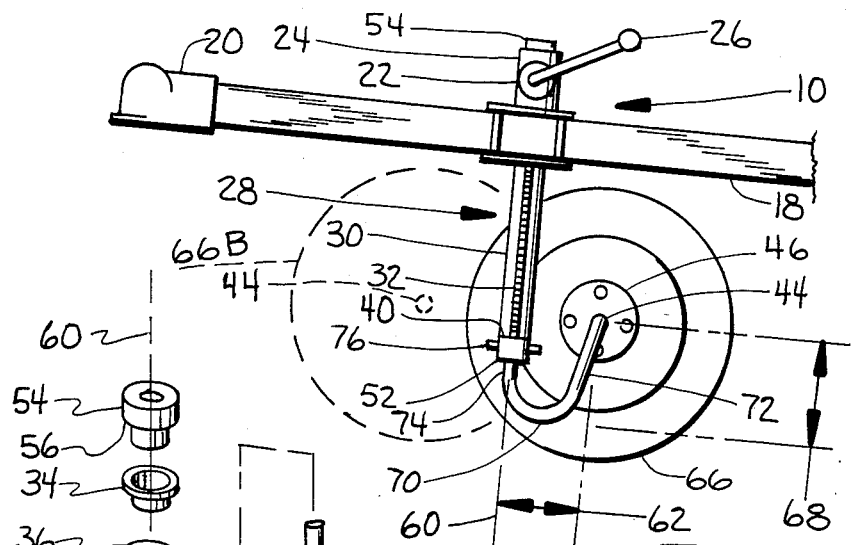
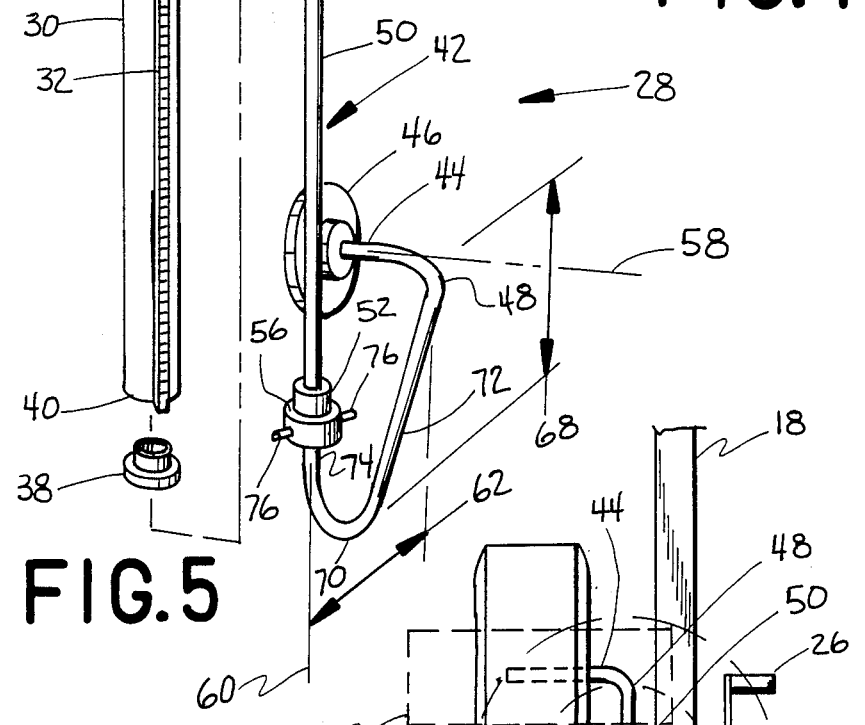
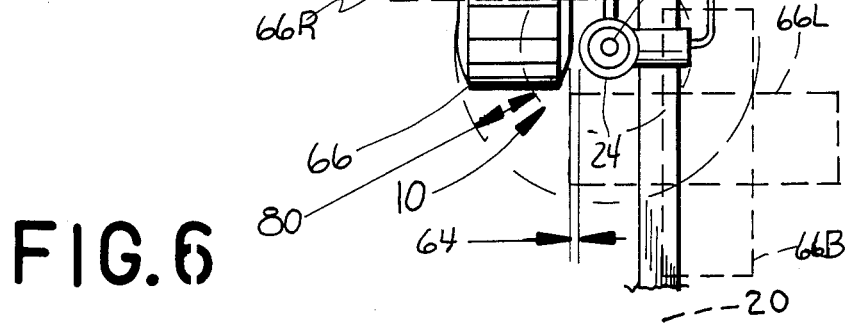

TRAILER JACK USING FULL SIZED SPARE TIRE

BACKGROUND OF THE INVENTION

Field of the Invention

This invention peertains to an improved trailer jack which has structure for raising and lowering a full diameter spare wheel and tire alongside of a trailer tongue, and to a method of storing and carrying a full diameter spare wheel and tire.

The Prior Art

Trailer jacks are quite old and well known. They typically have a raising mechanism which is fastenable to a trailer tongue, a vertically movable post of some type, and a manual crank or ratchet mechanism. Castor wheels or flat plates are common on the bottom end of the jack post.

The typical castor wheel is an all steel wheel or all rubber tire or metal wheel and rubber tire mounted on a corss-pin shaft in an inverted U-shaped castor. These wheels are all typically of small diameter, for example 4 to 6 inch diameter, and they have a multitude of shortcomings. These small castor wheels typically have load carrying capacity of less than 1,000 lbs. These small wheels are virtually useless on dirt or in mud and they bury themselves in hot asphalt driveways. Further, they are very difficult to castor and these small wheels hang up on the smallest of obstacles, and they hang up in cracks, dips and steps of hard surfaces. These small wheels are virtually useless on medium and heavy weight trailers. These small wheels normally are not removable from the trailer jack and they serve no other function. They are too small to be used as a spare tire and wheel for the trailer and/or the tow vehicle.

Carrying a spare trailer tire is also a problem. Most people throw spare boat trailer tires into the boat or carry it in the tow vehicle. Either way it is a nuisance.

It's quite easy to see what a problem spare wheels and tires are for trailers. A person merely has to count the disabled boat trailers on the side of the highways on Sunday evening when people return home.

OBJECT OF THE INVENTION

It is an object of the present invention to provide an improved trailer jack utilizing a full diameter spare trailer wheel and tire.

It is an object of the present invention to provide an improved castoring type trailer jack which utilizes a full size spare wheel and tire for the trailer.

It is an object of the present invention to provide a trailer having an improved jack utilizing a full size spare wheel and tire for the trailer.

It is an object of the present invention to provide a trailer having a castoring type trailer jack utilizing a full size spare wheel and tire.

It is an object of the present invention to provide an improved vertically movable trailer jack lift assembly.

It is an object of the present invention to provide an improved wheel lift member for a trailer jack.

It is an object of the present invention to provide a new method of stowing and carrying a full size trailer spare wheel and tire on a trailer jack.

SUMMARY OF THE INVENTION

An improved combination trailer jack and spare tire carrier has a raising mechanism, an elongate jack post which is movable up and down by the mechanism, and a spare wheel axle mounted to and co-movable with the post, the axle is offset from the post and is positioned between a top and bottom of the post.

A trailer having an axle, wheels, towing tongue and a jack mechanism on the tongue, has the improvement of an axle and hub for a trailer spare wheel and tire with the axle being positioned at a level between the top and bottom of a jack lift post in the mechanism.

A relatively vertically movable trailer jack lift assembly has an elongate jack post, and a spare tire axle which is generally perpendicular to the post and at a height which is between the top and bottom of the post.

A lift member for a castoring type trailer jack has an elongate generally horizontal axle, a generally upright jack lift element, offset structure securing the axle to the lift element wherein the axle is swivelable around the lift element and the axle is spaced from and generally perpendicular to the lift element, and structure on the axle for mounting a trailer spare wheel and tire in a plane generally parallel to and spaced from the lift element.

A method of storing and carrying a trailer spare wheel and tire has the steps of securing a trailer jack on a trailer tongue, rotatably mounting a trailer spare wheel and tire on the jack, lowering the spare wheel and tire alongside the trailer tongue to a support position below the tongue, raising the spare wheel and tire alongside the tongue in a generally vertical path to a storage position at a level mostly above the tongue, and locking the spare wheel and tire in the storage position.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 4 is a side elevational view of the structure of FIG. 3;

FIG. 5 is an exploded view of the movable lift assembly of the jack of FIGS. 1-4; and FIG. 6 is a top view of the lowered jack of FIGS. 3 & 4.

DESCRIPTION OF THE PREFERRED EMBODIMENT

Figure 1:
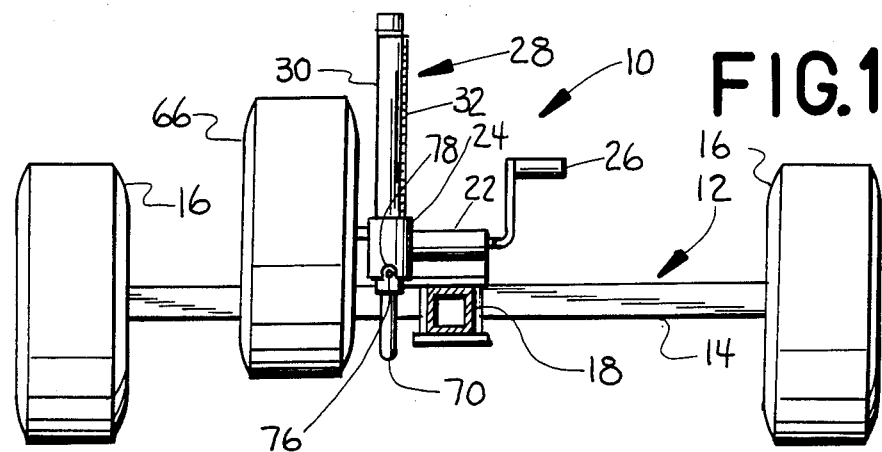
FIG. 1 is a front elevational view of the trailer and trailer jack of the present invention with the jack being up in the storgae position.

According to the principles of the present invention, an improved trailer jack, generally indicated by the numeral 10, is on a trailer, generally indicated by the numeral 12.

The trailer 12 has at least one transverse axle 14, a pair of regular size trailer wheels and tires 16, a tongue 18 extending forward from the axle 14 and some type of a coupler 20 on and toward the front of the tongue 18. The jack 10 is fastened to the tongue 18 adjacent to the coupler 20 by appropriate double ended L-bolts, or plates and bolts as well known.

The jack 10 has a raising mechanism 22, a post guide 24 and an actuator crank 26 which are fastened to the tongue 18 previously described and as is well known. A vertically movable lift assembly, generally indicated by the numeral 28 is held and controlled by the raising mechanism 22 and the guide 24. The lift assembly 28 has an elongate tubular lift post 30 with an external gear rack 32 wqhich preferrably extends the complete height of the post 28. The rack 32 is radially indexed to and is engaged and driven by the raising mechanism 22 which is often referred to as a gearbox. The tubular post 30 is constrained to be generally vertical and to be generally perpendicular to the tongue 18 by the guide 24. The post 30 and rack 32 are vertically movable inside of and through the guide 24. The post 30 is hollow and a top bearing 34 is mounted in the post top end 36, and a bottom bearing 38 is mounted in the post bottom end 40.

An important feature of this invention is a lift member generally indicated by the numeral 42 which is connected to an which is vertically co-movable with the post 30. The lift member 42 has a generally horizontally disposed spare tire axle 44 with a rotatable hub 46 for a full size spare wheel and tire 66 (hereinafter referred to as the "spare 66"). The spare axle 44 is connected to the post 30 by a U-shaped gosseneck offset structure 48 which is connected to a jack lift element 50 inside of the post 30. The spare axle 44, offset structure 48 and lift element 50 preferably are one integral piece of formed round steel rod. The lift element 50 has a bottom journal 52 rotatably journaled in the bottom bearing 38, and a top journal 54 rotatably journaled in the top bearing 34. The bottom journal 52 and top journal 54 each have an appropriate thrust surface 56 for vertically fixing the lift member 42 in the post 30. The spare axle 44 has a sprare axis 58 which is generally perpendicular to and spaced from a common lift axis 60 of the post 30 and lift element 50. This spacing between the spare axis 58 and lift axis 60 can be referred to as the trailing offset 62 as is designated in FIG. 4 and 5. The spare axle 44 and hub 46 and spare axis 58 are offset upward by the offset structure 48 and as is clearly shown in FIGS. 1-4, the spare axle 44 and hub 46 and spare axis 58 are positioned at a level well above the level of the post bottom end 40 so that the spare axle 44 and its axis 58 are at a level in between the post ends 36, 40.

Figure 3:
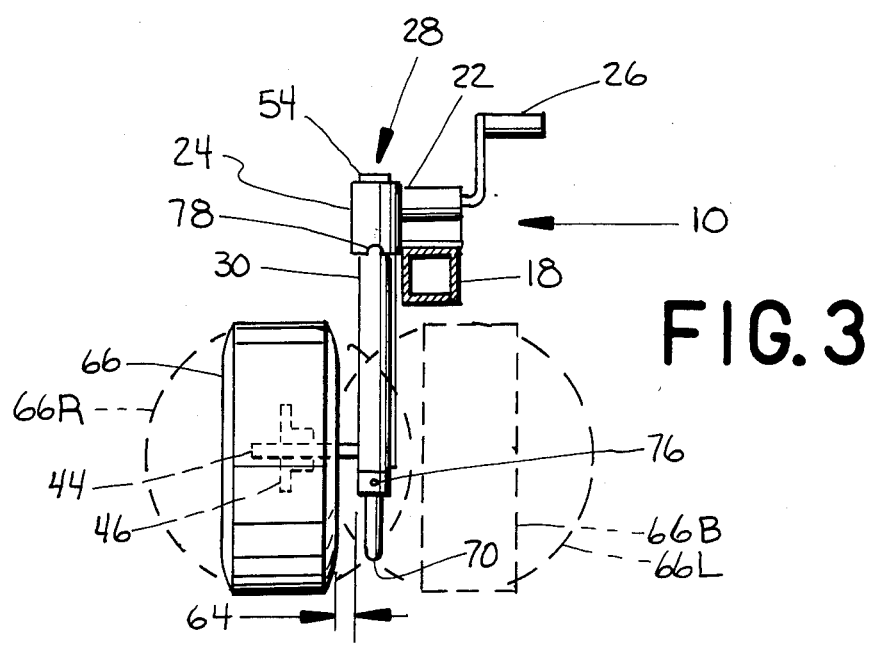
FIG. 3 is a front elevational view of the structure of FIG. 1 with the jack in the lowered position.

The spare axle 44 and spare hub 46 are also laterally offset from the post and lift element axis 60 by a transverse offset 64 designated in FIG. 3 and 6 which is sufficiently large so that the spare 66 is spaced to one side of the post 30 and post guide 24. The offset structure 48, as best shown in FIG. 4 & 5, offsets the spare axle 44 vertically and upwards more than the trailing offset 62. The vertical offset 68 is indicated best in FIG. 4. The offset structure 48 has a bottom 70 which extends below the metal wheel of the spare 66, and an upward extending outer offset leg 72 which has a greater vertical rise than the vertical rise of an inner leg 74. The outer offset leg 72 is connected directly to the spare axle 44, and the inner offset leg 74 is connected directly to the lift element 50.

The lift assembly 28 forms a relatively large castor structure enabling the lift member 42 and spare 66 to rotate around the post axis 60 with respect to the post 30, gearbox 22 and trailer 12.

The lift member 42 has one or two lock pins 76 which are radially fixed with respect to the lift member 42. A corresponding lock notch 78 is provided in the bottom of the guide 24. The lock notch 78 is open on the bottom and is lockingly receptive of the lock pin 76 when the post 30 and lift member 42 are completely raised.

With respect to the designation of the offsets 62, 64, 68, the trailing offset 62 is in a relative Z axis along the length of the trailer and which is generally perpendicular to the spare axle axis 58, the transverse offset 64 is in a relative X axis which is transverse to the length of the trailer and generally parallel to both the spare axle axis 58 and the trailer axle 14, and the vertical offset 68 is on an upright relative Z axis. Such designation of X, Y and Z axis being conventional for vehicles.

Figure 2:
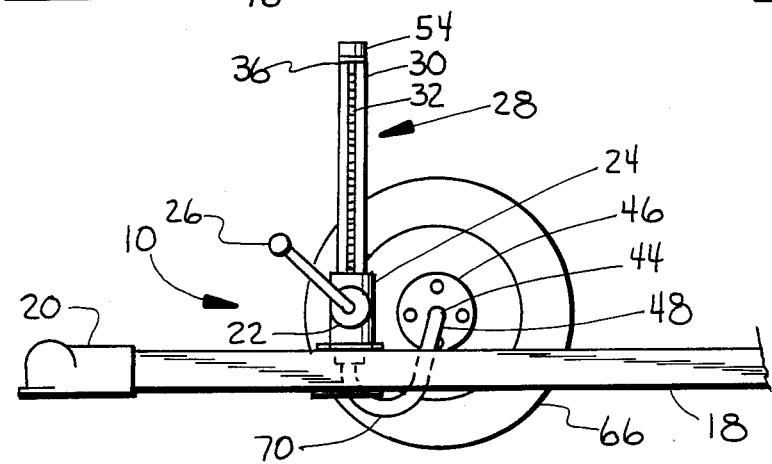
FIG. 2 is a side elevational view of the structure of FIG. 1.

In use of the jack 10 and trailer 12 and in the practice of the method of the present invention, the jack 10 is fastened and secured near the front of the trailer tongue 18. It is to be appreciated that this jack 10 can be easily retrofitted on existing trailers, and further that the lift assembly 28 of this invention, and possibly the lift member 42 with the bearings 34, 38 can be retrofitted in existing trailer jacks. A regular full diameter and preferrably full size spare 66 for the trailer 12 is mounted upon the rotatable spare hub 46. The spare 66 may also be a full diameter spare for the tow vehicle (not shown). The spare 66 and spare hub 46 are rotatable on the spare axle 44. This trailer jack 10 is particularly useful on boat or camper trailers and the spare 66, when retracted up into the storage position as shown in FIGS. 1 and 2, will fit right under the bow of a boad and alongside the bost hoist, or conveniently in front of the camper body. The jack 10 is constructed so that the stored spare 66 extends slightly below the tongue 18 as shown in FIG. 2 so that the coupler 20 does not dig into dirt and asphalt. When the spare 66 is retracted upward as in FIGS. 1 & 2, the spare is locked in a plane which is alongside of and parallel to but spaced transversely from the tongue 18 and the guide 24 as is best shown in FIGS. 1 & 6. The spare 66 is parallel to the regular trailer tires 16 and the entire trailer 12 can easily be moved straight forward or backwards on the rotatable spare 66 when the spare is retracted as shown in FIGS. 1 & 2.

When it is desired to raise the trailer tongue 18, and/or to utilize the caster structure and features of the jack 10, the crank 26 is manipulated until the lift assembly 28 is positively lowered into the alternative castor position shown best in FIGS>3 & 4. When in the castor position, lock pin 76 and lock notch 78 are not engaged and the entire lift member 42 and spare 66 are free to rotate or castor about the post 30 and post axis 60. The spare 66 can rotate in a complete circle to either direction around the post 30 and under the tongue 18 either in front of or in back of the jack 10. As shown in FIG. 3, if the spare 66 is in the shown position, the trailer 12 can be pulled forward. If the spare 66 is in position L, the trailer tongue 18 can be pulled to the right. In FIG. 4, the spare 66 is shown enabling the trailer 12 to be pulled forward. If the spare 66 were in position B, the trailer 12 could go backwards. The full size spare 66 will automatically castor about the post 30 or orient itself properly in response to sufficient force upon the tongue 18. As seen in FIG. 6, the spare axle 44 is revolvable in a complete planar toroid 80 around and at a level within the vertical height of the post 30. The axle toroid 80 is above the post bottom 40 bottom below the post top 36. The plane of the toroid is at least half of the diameter of the spare 66 below the tongue 18 when the jack 10 is in the alternate configuration shown in FIGS. 3 & 4.

The jack 10 can also be used effectively without the spare 66, and the offset bottom 70 will engage concrete or a pressure pad (not shown) to lift up the tongue.

When the tongue 18 is to be lowered, the spare 66 is initially in the position shown in FIGS. 3 & 4, and the entire lift assembly 28 and spare 66 are cranked right straight up alongside of the tongue 18. When the spare 66 is pulled all the way up, the lock pin 76 goes into the lock notch 78 as best shown in FIG. 1 and the lift member 42 is locked in place with the spare axle perpendicular to and well above the tongue 18, the spare 66 well above and alongside the tongue 18 the tire of the spare 66 protrudes below the tongue 18 just enough to support the coupler 20 off of the floor.

The spare axle 44 is pulled up to a level above the tongue 18 and above the connection of the jack 10 to the tongue. The new improved trailer 12, jack 10, lift assembly 28 and lift member 42 enable the use of a full size spare 66 and a regular trailer hub 46 that can be used as spares on the trailer 12. The spare 66 can also function as a tow vehicle spare wheel and tire which opens up additional space in a tow vehicle.

This invention is particularly easy to use to manually castor a loaded trailer 12 about in a garage or in a driveway or on grass. The full size spare 66 supports the tongue 18 well on surfaces where a conventional castor wheel would sink in. The full size spare 66 does not snag on small obstructions.

The jack 10 can also be used to brake the trailer 12 in a parked position. With reference to FIGS. 3 or 6, when the spare 66 is in either position 66R or 66L, the trailer tongue 18 can be lowered upon the spare 66 which locks the spare 66 so that it cannot turn with respect to the tongue 18 or the trailer 12. The trailer 12 is thereby rendered immobile until such time as the tongue is elevated off of the spare 66.

Although other advantages may be found and realized and various modifications may be suggested by those versed in the art, it should be understood that we wish to embody within the scope of the patent warranted hereon, all such embodiments as reasonably and properly come within the scope of our contribution to the art.

We claim as our invention:

1. An improved combination trailer jack and spare trailer wheel and tire carrier, comprising
    (a) a raising mechanism having a post guide, a raising actuator movably mounted in a y direction in said mechanism, and securement means for securing the post guide and atuator to a trailer tongue;
    (b) an elongate jack post operatively connected to the raising mechanism, said post being vertically movable up and down in the post guide and with respect to the securement means;
    (c) a spare wheel axle mounted to and vertically co-movable with said post, said axle being generally perpendicular to said post, said axle being vertically positioned between a top and a bottom of said vertically movable post and being spaced upwards of the bottom of the post;
    (d) a spare trailer wheel hub mounted on said axle, said hub having wheel mount means thereon for removably mounting thereon a full sized spare trailer wheel and tire in a plane generally parallel to and offset from said post and said guide, with an axis of said hub and the wheel and the tire being spaced upward of said post bottom, with said hub, spare wheel and tire being retractable upwards from below said post guide to a storage position alongside said vertically movable post and alongside and at the same level as said post guide; and
    (e) offset structure extending from the post to the axle and providing an offset in an X direction from said post and said guide, said offset structure being movable up and down with the post and being vertically movable past said guide, at least in part.

2. The jack of claim 1, in which said offset structure includes an offset in a Z direction for said guide.

3. The jack of claim 2, including castor structure pivotally mounting said axle and said hub to said jack post, said axle and said hub being pivotable about an axis of the post when said post is moved to a down position in said guide.

4. The jack of claim 3, in which the axle is rotatable in a planar toroid about the post axis.

5. The jack of claim 4, in which the axle is rotatable completely around the post in either direction of rotation.

6. The jack of claim 3, in which said castor structure includes vertically spaced apart bearings in the post, and in which said offset structure is connected to a lift element extending through said post and which is journaled in said bearings.

7. The jack of claim 1, in which the axle is elevatable with respect to said guide in a generally vertical straight line parallel to the post, to a storage position at a level above the level of the tongue securement means, so that a majority of a spare wheel and inflated tire removable mounted upon said hub will be substantially above the level of the tongue securement means.

8. The jack of claim 3, including a radial lock in said castor structure, and locking means fixed to said raising mechanism for enagaging said radial lock and radially fixing the axle, the hub and the spare wheel and tire in a storage position radially fixed with respect to the jack securement means.

9. The jack of claim 3, in which the post is a tube, and said axle is connected to a jack lift element rotationally journaled in said tube.

10. In a trailer having an axle, a pair of spaced apart wheels and pneumatic tires on the axle, an elongate towing tongue extending forward and generally perpendicular of the axle, a trailer jack raising mechanism secured to the tongue, and a relatively movable jack lift post movably held by said raising mechanism, said lift post being selectively raisable and lowerable by said mechanism with respect to said tongue; the improvement comprising a trailer jack axle having a hub thereon with spare wheel mounting means for removably mounting a complete full sized trailer spare wheel and tire on said hub, offset structure extending from the post to said axle and providing said axle with an offset in an X direction away from said post and said tongue, said spare wheel mounting axle and hub being connected to a bottom portion of said jack lift post and being co-movable up and down with said jack lift post in a y direction, said axle and hub being positioned between a top and bottom of said post and being transversely offset in said x direction to one side of said post, said axle and hub being raisable by said mechanism from below said tongue to a level above an underside of said tongue, enabling storage of the complete full sized trailer spare wheel and tire alongside and mostly above said tongue.

11. A trailer according to claim 10 in which the improvement further comprises cator structure connecting said offset structure and axle and hub to said post, said axle and hub together with said complete full sized spare trailer wheel and tire thereon being completely rotatable about said post and under said tongue when said post is completely lowered.

12. A trailer according to claim 11, wherein said improvement further comprises means in said jack for locking the axle in a position above the tongue with said axle being generally perpendicular to the tongue and being offset to one side of the tongue.

13. A trailer according to claim 11, in which the improvement further comprises a tubular elongate said post having bearings in its top and bottom, said axle being connected to a lift element rotatably mounted in said post bearings.

14. The subcombination of a relatively vertically movable trailer jack lift assembly for a castoring type trailer jack, comprising
   (a) an elongate jack post having thereon engagement means for positively engaging a vertical lift mechanism in a trailer jack, and elongate means for being guided up and down by the jack;
   (b) an elongate spare tire axle having a spare trailer tire and wheel hub thereon and having an axis generally perpendicular to an axis of the post;
   (c) offset structure extending from said post to said axle and securing said axle to said post with said axle being spaced in an X direction from said post, said axle being positioned upward in a y direction from a bottom end of the jack post and at a height which is between a top end and the bottom end of the post and which is alongside the jack post at a level above at least a portion of said engagement means;
   (d) said axle being offset in said x direction to one side from said jack post and having a trailing offset spaced to the rear in a z direction from said jack post; and
   (e) including swivel structure securing said offset structure to said jack post, a complete full sized trailer spare wheel and tire for a load bearing axle of the trailer being mountable on said hub alongside and spaced from said engagement means.

15. The subcombination of a relatively vertically movable lift member for a castoring type trailer jack, comprising:
   (a) an elongate axle having an axis for being generally horizontally disposed;
   (b) a jack lift element having a generally upright axis at a generally right angle to said axle axis, said lift element having means for being vertically secured and restrained in a vertically movable column of a trailer jack;
   (c) offset structure securing said generally horizontal axle to said generally upright lift element, said axle and offset structure defining structure which provides that
      (1) said axle is swivelable around said lift element axis, and
      (2) said axle axis is generally perpendicular to and is spaced from said lift element upright axis so that the said two axis pass by each other within the length of the lift element but do no intersect each other, and
   (d) means on said axle for removably and rotatably mounting a complete full size trailer spare wheel and tire in a plane which is generally perpendicular to said axle axis and which is generally parallel to and which is offset and spaced from said element axis with said spare wheel and tire being alongside and generally parallel to and spaced from said lift element.

16. The lift member of claim 15, in which said lift element is an elongate generally vertical structure having means above said axle at an element top and means below said axle at an element bottom for being rotatably journaled and suspended in the vertically movable column of the trailer jack.

17. The lift mechanism of claim 15, in which the axle axis is completely above the offset structure, and in which the axle is positioned at a mid-height along a length of an elongate said lift element.

18. The lift mechanism of claim 15, including index means on said lift element which project radially outward of said lift element axis for selectively radially locking and unlocking said lift member with respect to a trailer and the lift element axis.

* * * * *